US 6,424,786 B1

(12) United States Patent
Beeson et al.

(10) Patent No.: US 6,424,786 B1
(45) Date of Patent: Jul. 23, 2002

(54) ILLUMINATION ASSEMBLY

(75) Inventors: Karl W. Beeson, Princeton; Scott M. Zimmerman, Basking Ridge; Jose C. Diaz, Lodi; Macrae Maxfield, Teaneck, all of NJ (US); Michael Foley, Pittsford, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/549,665

(22) Filed: Apr. 14, 2000

Related U.S. Application Data (60) Continuation-in-part of application No. 09/411,115, filed on Oct. 4, 1999, now Pat. No. 6,261,664, which is a division of application No. 08/759,338, filed on Dec. 2, 1996, now Pat. No. 6,010,757.

(51) Int. Cl.[7] ................................................ G02B 6/10
(52) U.S. Cl. ..................... 385/146; 385/43; 385/51; 385/147
(58) Field of Search ..................... 385/146, 43, 147, 385/51

(56) References Cited

U.S. PATENT DOCUMENTS

| | | | |
|---|---|---|---|
| 3,218,924 A | 11/1965 | Miller | 88/28.93 |
| 4,509,823 A | 4/1985 | Moriguchi et al. | 350/128 |
| 4,573,764 A | 3/1986 | Bradley | 350/128 |
| 4,752,116 A | 6/1988 | Sekiguchi | 350/128 |
| 4,859,027 A | 8/1989 | Kishida | 350/128 |
| 4,936,652 A | 6/1990 | Clausen et al. | 350/128 |
| 4,979,800 A | 12/1990 | Clausen et al. | 350/128 |
| 4,993,806 A | 2/1991 | Clausen et al. | 350/128 |
| 5,230,990 A | 7/1993 | Iwasaki et al. | 430/321 |
| 5,396,350 A | 3/1995 | Beeson et al. | 359/40 |
| 5,428,468 A | 6/1995 | Zimmerman et al. | 359/40 |
| 5,462,700 A * | 10/1995 | Beeson et al. | 264/1.27 |
| 5,477,380 A | 12/1995 | Watanabe et al. | 359/457 |
| 5,513,036 A | 4/1996 | Watanabe et al. | 359/457 |
| 5,521,725 A | 5/1996 | Beeson et al. | 359/40 |
| 5,555,109 A | 9/1996 | Zimmerman et al. | 359/40 |
| 5,598,281 A | 1/1997 | Zimmerman et al. | 349/5 |
| 5,657,408 A * | 8/1997 | Ferm et al. | 385/43 |
| 5,706,065 A | 1/1998 | Yano | 349/112 |
| 5,739,931 A | 4/1998 | Zimmerman et al. | 359/40 |
| 5,745,288 A | 4/1998 | Miyata et al. | 359/457 |
| 5,880,887 A | 3/1999 | Goto | 359/626 |
| 5,889,613 A | 3/1999 | Watanabe | 359/456 |
| 6,031,664 A | 2/2000 | Goto | 359/456 |
| 6,044,196 A * | 3/2000 | Winston et al. | 385/146 |
| 6,010,747 A * | 4/2000 | Beeson et al. | 427/162 |
| 6,046,847 A | 4/2000 | Takahashi | 359/457 |

FOREIGN PATENT DOCUMENTS

| | | | | |
|---|---|---|---|---|
| EP | 0 859 270 A1 | 8/1998 | | 21/62 |
| EP | 0 902 316 A2 | 3/1999 | | 21/62 |
| JP | 11072849 | 3/1999 | | 21/62 |
| JP | 11084108 | 3/1999 | | 5/2 |
| JP | 11084109 | 3/1999 | | 5/2 |
| WO | WO98/32049 | 1/1997 | | 21/62 |

* cited by examiner

Primary Examiner—Cassandra Spyrou
Assistant Examiner—Christopher S. Maxie
(74) Attorney, Agent, or Firm—Kris Fredrick; Brian N. Tufte (57) ABSTRACT

An optical illumination assembly comprising an array of optical microprisms and microlenses for redirecting light from a light source. Such displays are used in a wide variety of applications such as backlit flat panel displays requiring a directed light source which provides an efficient output of light. The illumination assembly has a light transmitter optically coupled to an input end of array of microprisms through an optional diffuser, and a microlens on the light output end of each microprism. The microprisms have a light input end optically coupled to the light transmitting means and a light output end spaced from the light input end. Two pairs of oppositely positioned sidewalls having one an edge defined by said light input end and another edge defined by said light output end are positioned for reflecting of transmitted light toward the light output end; When light from the light transmitting means enters each microprism through the light input end, the light is directed by said sidewalls through the microprisms to each light output end and then through the microlenses. Optionally a light diffuser is positioned between the light transmitter and the input end of the microprisms.

29 Claims, 7 Drawing Sheets

FIG. 11

ILLUMINATION ASSEMBLY

CROSS REFERENCE TO RELATED APPLICATION

This application is a continuation-in-part of application Ser. No. 09/411,115 filed Oct. 4, 1999 now U.S. Pat. No. 6,261,664 which is a divisional of Ser. No. 08/759,338 filed Dec. 2, 1996, now U.S. Pat. No. 6,010,747, which is incorporated herein by reference.

BACKGROUND OF THE INVENTION

1. Field of the Invention

This invention relates to an optical illumination assembly that provides a high degree of light transmission. More particularly, the invention is directed to an illumination assembly having a plurality of optical microprisms, microlenses and a diffuser for redirecting light from a light source.

2. Description of the Related Art

Optical illumination systems, such as backlit flat panel displays require a directed light source which provides an efficient output of light. Such displays are used in a wide variety of applications such as computer monitors, televisions, avionics displays, aerospace displays, automotive instrument panels, and other devices that provide text, graphs or video information. These displays can replace conventional cathode ray tubes and offer the advantages of lower profile, reduced weight and lower power consumption. There are many other illumination applications that can take advantage of such an illumination system employing such an arrangement of microprisms, microlenses and diffuser. Such applications exist in the automotive industry, the aerospace industry and the commercial and residential markets. Some automotive applications, include low profile car headlights and taillights; low profile interior car lights such as reading lights and map lights; light sources for dashboard displays; backlights for flat panel navigation displays, flat panel auto TV screens and flat panel electronic instrument displays; traffic lights; and backlights for road signs. Illustrative examples in the aerospace industry include backlights for flat panel cockpit displays and flat panel TV screens in the passenger section of the aircraft; low profile reading lights and aircraft landing lights; and runway landing lights. Residential and commercial applications include low profile interior and exterior spotlights and room lighting with a low degree of collimation; backlights for flat panel TV screens, LCD displays, such as computers, game displays, appliance displays, machine displays, picture phones, and rear projection displays including televisions and video walls.

One display which can eliminate the shortcomings of a cathode ray tube is the flat panel liquid crystal display (LCD). LCDs suffer from a number of inherent disadvantages. For example, at high viewing angles, LCDs exhibit low contrast and changes in visual chromaticity as the viewing angle changes. The characteristics of the backlighting apparatus are very important to both the quality of the image displayed by the matrix array of picture elements of the LCD and the profile of the display. See U.S. Pat. Nos. 5,128,783 and 5,161,041 for a discussion of the deficiencies in past backlighting configurations. Additionally, current backlighting systems, in applications such as laptop computers, are inefficient with regard to the amount of light that the viewer sees versus the light produced by the source. Only about ten to twenty percent of the light generated by the light source ends up being usefully transmitted through the computer display. Any increase in the light throughput will positively impact power consumption and ultimately increase the battery life of a portable computer and as a screen for rear projection displays. Accordingly, there exists a need in the flat panel electronic display art to provide a backlight assembly that provides an energy efficient and uniform light source for the electronic display while maintaining a narrow profile.

U.S. Pat. Nos. 5,555,109 and 5,396,350 provide an optical illumination system employing an array of microprisms attached to an array of microlenses via an intermediary spacer. Such a spacer adds an element of complexity to the described system. It also does not provide for the reception of diffuse light through a diffuser.

The present invention is directed to an improved illumination assembly which is useful for flat panel displays, having an improved backlight assembly which provides an energy efficient and uniform light source. The improvement by the use of the present invention is that an energy efficient, bright and uniform distribution of light is provided in a low profile assembly. The optical illumination assembly comprises an array of microprisms in combination an array of microlenses and an optional diffuser whereby the microprisms and optional diffuser are operatively disposed between light transmitting means and the microlenses.

SUMMARY OF THE INVENTION

The invention provides an illumination assembly comprising:
(a) a light transmitting means;
(b) an array of microprisms wherein each microprism comprises:
  (i) a light input end optically coupled to said light transmitting means;
  (ii) a light output end spaced from the light input end;
  (iii) a pair of oppositely positioned first sidewalls, each first sidewall having an edge defined by said light input end and an edge defined by said light output end; at least one of said first sidewalls being positioned for effecting reflection of transmitted light toward the light output end;
  (iv) a pair of oppositely positioned second sidewalls, each second sidewall having an edge defined by said light input end and an edge defined by said light output end; at least one of said second sidewalls being positioned for effecting reflection of transmitted light toward the light output end; and
(c) a microlens on the light output end of each microprism, such that when light from said light transmitting means enters each microprism through said light input end, the light is directed by said sidewalls through said microprisms and out each light output end.

The invention also provides an illumination assembly comprising:
(a) a light transmitting means;
(b) an array of microprisms wherein each microprism comprises:
  (i) a light input end optically coupled to said light transmitting means;
  (ii) a light output end spaced from the light input end;
  (iii) a pair of oppositely positioned first sidewalls, each first sidewall having an edge defined by said light input end and an edge defined by said light output end; at least one of said first sidewalls being positioned for effecting reflection of transmitted light toward the light output end;
  (iv) a pair of oppositely positioned second sidewalls, each second sidewall having an edge defined by said light input end and an edge defined by said light output end; at least one of said second sidewalls being positioned for effecting reflection of transmitted light toward the light output end; and (c) a microlens on the light output end of each microprism, such that when light from said light transmitting means enters each microprism through said light input end, the light is directed by said sidewalls through said microprisms and out each light output end.

(d) a light diffusing element optically coupled between the light transmitting means and the light input end.

DETAILED DESCRIPTION OF THE PREFERRED EMBODIMENT

Figure 1:
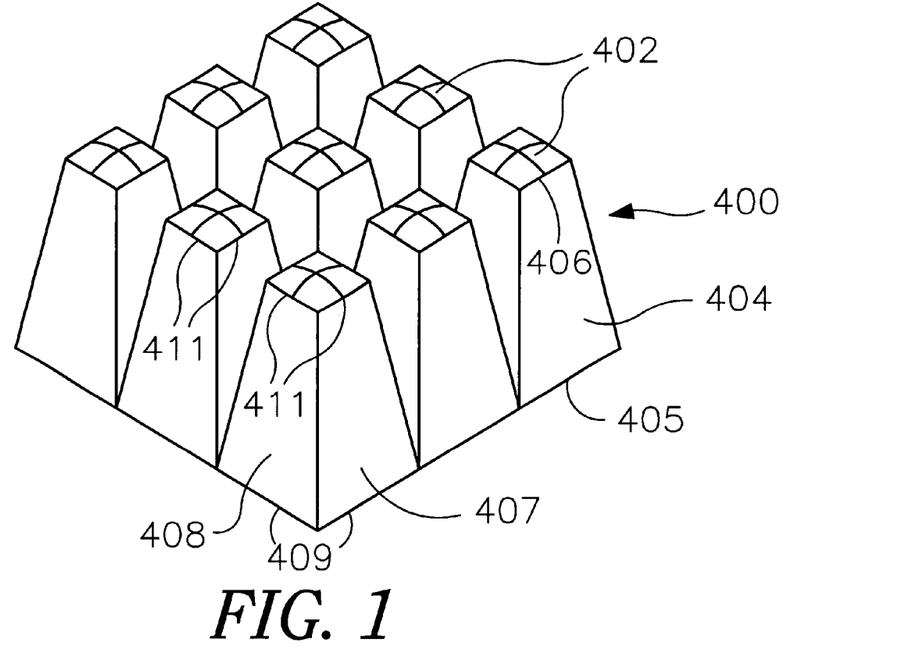
FIG. 1 shows a perspective view of an illumination assembly including an array of microprism and microlens on the light output end of each microprism. The microlenses have dual axis of curvature.
Figure 2:
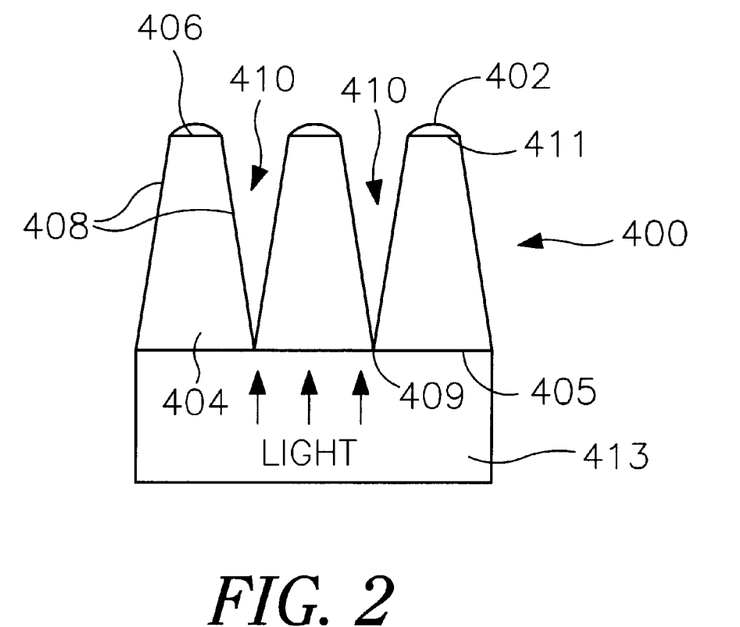
FIG. 2 shows a side elevational view of the illumination assembly of FIG. 1.

Referring to the drawings, FIGS. 1 and 2 shows an illumination assembly 400 including an array of microprisms 404 and a microlens 402 on each microprism. Each microprism has a light input end 405 optically connected to a light transmitting means, a light output end 406 and each microprism has a square cross-section. Each prism has a pair of oppositely positioned first sidewalls 408 and second side walls 407, each sidewall having an edge 409 at the light input end, and an edge 411 at the light output end. The first and second sidewalls are positioned for reflection of transmitted light from the light input end 405 toward the light output end 406. The sidewalls may optionally be provided with a light reflectance coating applied on the sidewalls to reduce light loss through the sidewalls.

The microprisms form a space 410 between each microprism of the array. When light from a light transmitting means 413 is directed into each microprism through the light input end 405, the light is directed by the sidewalls 407 and 408 through the microprisms and out each light output end 406 and then subsequently through each microlens 402.

Illustrative of useful light transmitting means 413 are lasers, fluorescent tubes, light emitting diodes, incandescent lights, sunlight, a light pipe, light wedge, waveguide, rear projection illumination means such as a CRT, LCD, DMD or light valve light engine, or any other similar structure known to those skilled in the art.

Preferably the microlenses are convex as may be seen most clearly in FIG. 2. The microlenses may have two perpendicular axes of curvature as may also be seen in FIG. 1. The microlenses may be integrally formed with the light output end of each microprism or they may be directly attached to the light output end of each microprism provided there is no intermediate spacer element. When the microlenses are attached to the output end of the microprism, they are chosen to have substantially the same index of refraction as the microprisms. Also, in this case, the microlenses are directly attached to the light output end of each microprism by means of an index of refraction matching fluid or adhesive.

The microprisms and microlenses are transparent to light within the wavelength range from about 400 to about 700 nm. They preferably have an index of refraction of from about 1.40 to about 1.65, more preferably from about 1.45 to about 1.60. The microprisms and microlenses may be made from any transparent solid material. Preferred materials include transparent polymers, glass and fused silica. Desired characteristics of these materials include mechanical and optical stability at typical operation temperatures of the device. Most preferred materials are glass, acrylics, polycarbonates, polyesters, polymethylmethacrylate, poly (4-methyl pentene), polystryrene and polymers formed by photopolymerization of acrylate monomers. Preferred materials include polymers formed by photopolymerization of acrylate monomer mixtures composed of urethane acrylates and methacrylates, ester acrylates and methacrylates, epoxy acrylates and methacrylates, (poly)ethylene glycol acrylates and methacrylates and vinyl containing organic monomers. Useful monomers include methyl methacrylate, n-butyl acrylate, 2-ethylhexyl acrylate, isodecyl acrylate, 2-hydroxyethyl acrylate, 2-hydroxypropyl acrylate, cyclohexyl acrylate, 1,4-butanediol diacrylate, ethoxylated bisphenol A diacrylate, neopentylglycol diacrylate, diethyleneglycol diacrylate, diethylene glycol dimethacrylate, 1,6-hexanediol diacrylate, trimethylolpropane triacrylate, pentaerythritol triacrylate and pentaerythritol tetra-acrylate. Especially useful are mixtures wherein at least one monomer is a multifunctional monomer such as diacrylate or triacrylate, as these will produce a network of crosslinks within the reacted photopolymer.

Microprisms 404 are separated by interstitial regions 410. The index of refraction of interstitial regions 410 must be less than the index of refraction of the microprisms to allow light striking the sidewalls to be reflected and exit through the output end. Preferred materials for interstitial regions include air, with an index of refraction of 1.00 and fluoropolymer materials with an index of refraction ranging from about 1.16 to about 1.40. The most preferred material is air. Optionally, a light absorbing, i.e. a black colorant is positioned in the regions 410 between the sidewalls of adjacent microprisms to increase contrast. This improved contrast is particularly useful when the system described herein is used for rear projection screen applications. Preferably, the interstitial regions 410 are filled with an absorbing material having a refractive index lower than the refractive index of the microprisms.

The microprisms may be arranged in any pattern on the light transmitting means 413, such as in a square, rectangular or hexagonal pattern. Repeat distances may be equal or unequal and may vary widely depending on the resolution and dimensions of the display. An optional adhesion promoting layer which is an organic material that is light transmissive may be used to causes the microprisms to adhere strongly to the light transmitting means 413. Such materials are well known to those skilled in the art. The thickness of adhesion promoting layer is not critical and can vary widely. In the preferred embodiment of the invention, adhesion layer is less than about 30 micrometers thick.

The microprisms 404 are constructed to form a six-sided geometrical structure having four sidewalls 407 and 408, a light input end 405 parallel with a light output end 406, wherein the light output end 406 is smaller in surface area than the light input end 405. The four sidewalls are angled in such a way that light traveling through the light transmitting means 413, is captured and redirected by the microprisms through to the microlenses. The microlenses are formed with the proper curvature and positioned so that the light emanating from each microprism is directed to a corresponding microlens. This can be enhanced by incorporating prism angles which enable total internal reflection (TIR) and/or by incorporating a low index material in the interstitial regions 410. In the case of rear projection applications, the microlenses are used to control the spread of light in one or multiple axes. As shown in FIG. 2, each microprism 404 is formed so that sidewalls 407 and 408 form a tilt angle to the normal of the surface of light transmitting means of from about 2 degrees to about 25 degrees. More preferred values for tilt angle is from about 5 degrees to about 25 degrees, and still more preferably from about 5 to about 20 degrees. As will be obvious to those skilled in the art, tilt angle determines at which angle with respect to the normal of the light output surface the spatially directed light will emerge. The height of the microprisms may vary widely depending on the dimensions and resolution of the display. That is, smaller displays, such as laptop computer displays and avionics displays would have greatly reduced dimensions versus larger displays such as large screen, rear projection, flat-panel televisions.

The microlenses can be either a spherical lens, an aspherical lens, or an astigmatic lens. The microlenses are not necessarily circular, but can be rectangular in shape. If the microlenses are spherical lens, the lens will have one curved surface having a radius of curvature. The radius of curvature can vary widely depending on the repeat distances of the corresponding microprism array. In order that the microlenses collect substantially all of the light directed out of the light transmitting means by the microprisms, the f-number of the microlenses should be relatively small. The f-number values for the microlenses can range from about 0.5 to about 4.0. More preferred values for the f-number range from about 0.6 to about 3.0.

Arrays of microprisms and microlenses can be manufactured by any number of techniques such as molding, including injection and compression molding, casting, including hot roller pressing casting, photopolymerization within a mold and photopolymerization processes which do not employ a mold. A preferred manufacturing technique would be one that allows the array of microprisms and array of microlenses to be manufactured as a single integrated unit. An advantage of this technique would be the elimination of alignment errors between the array of microprisms and microlenses if the arrays were manufactured separately and then attached in the relationship described above.

Figure 3:
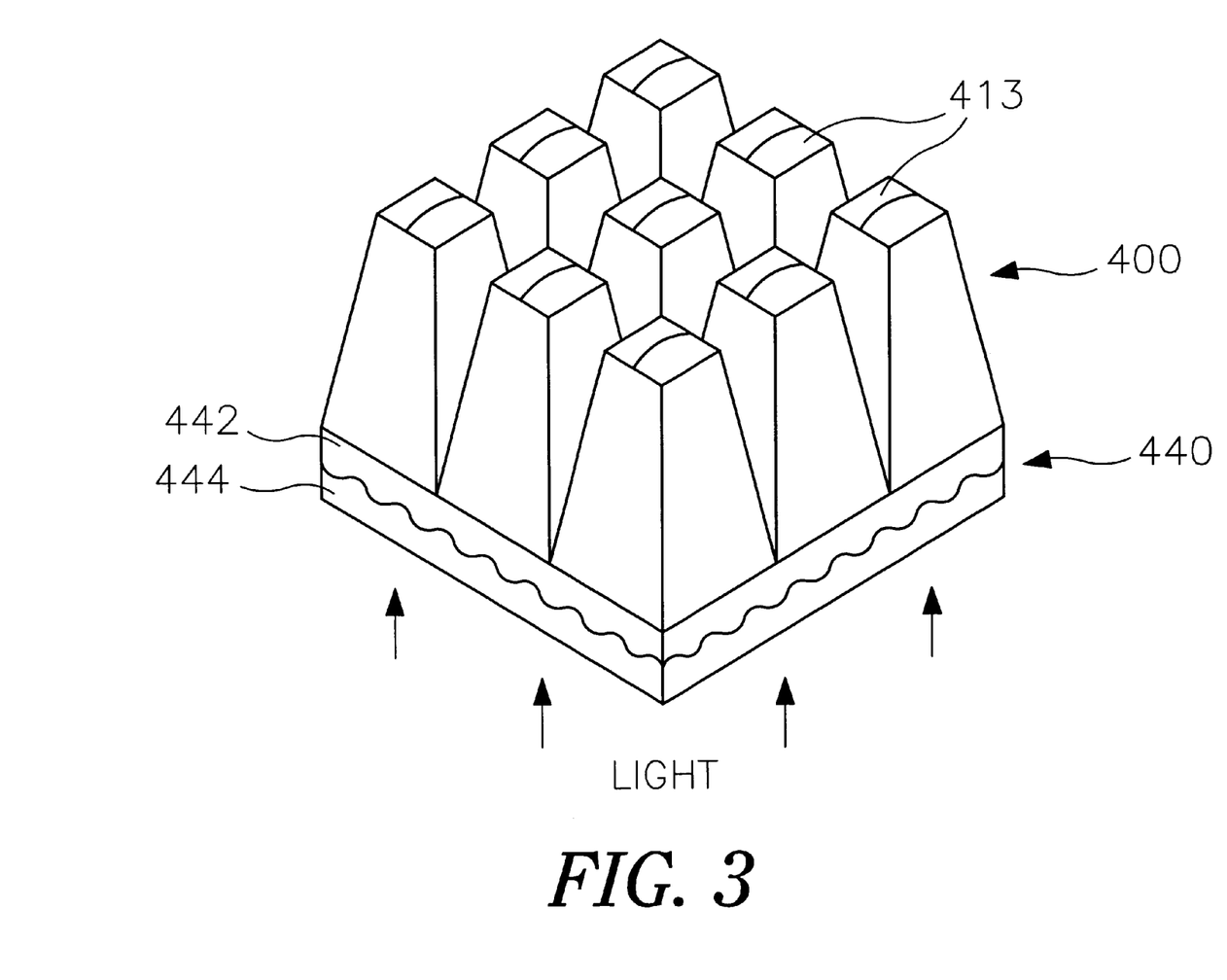
FIG. 3 shows a perspective view of another embodiment of an illumination assembly including a diffuser and wherein the microlenses have a single axis of curvature.

FIG. 3 shows a perspective view of another embodiment of an illumination assembly 400. In this case, the microlenses 413 have a single axis of curvature. In addition, the assembly includes an optical diffuser 440 optically coupled between the light transmitting means and the light input end of the microprisms. Diffuser 440 comprises a transparent or translucent substrate 444 preferably having smooth bumps on a substrate surface. The bumps range from about 1 micron to about 20 microns in both height and width, although they may be larger or smaller. Mating with the bumps is an optional fill layer 442 which serves to reduce backscattering of light.

A suitable light diffuser can be fabricated from a film of photopolymerizable material on a substrate by directing collimated or nearly-collimated light through a substrate of a transparent or translucent material and into the photopolymerizable material. Collimated light may be defined as that light where the divergence angle of the light rays is less than 0.5 degrees. By contrast, the divergence angle of the light rays in nearly-collimated light is less than 10 degrees, preferably less than +5 degrees, and more preferably less than 3.5 degrees. In this application, whether collimated or-nearly-collimated, the light is preferably incoherent, i.e., light that does not have a uniform phase. Most light sources (with the exception of laser light sources) such as arc lamps, incandescent lamps, or fluorescent lamps produce incoherent light, although coherent light may also be utilized.

The photopolymerizable material is exposed to the light for a period of time sufficient to crosslink or polymerize only a portion of the material. After this has occurred, the non-crosslinked portion of the material is removed, leaving a highly-modulated surface on the photopolymerized portion. This remaining structure can be employed directly as a diffusser or it may used to create a metallic replica for embossing another material to create a diffuser.

Suitable materials for the diffuser substrate include optically clear, transparent materials; semi-clear, transparent materials with some haze or light scattering due to inhomogeneities in the composition or the structure of the material; and translucent materials. Suitable materials for the substrates may also be classified by their crystallinity and include amorphous materials; semi-crystalline materials that contain crystalline domains interspersed in an amorphous matrix; and purely crystalline materials. The substrate typically has two opposing flat surfaces generally parallel to each other, but other configurations could be employed. Materials meeting the criteria of the foregoing paragraph include inorganic glasses such as borosilicate glass and fused silica; amorphous polymers such as cellulose acetate, cellulose triacetate, cellulose butyrate, ethylene-vinyl alcohol copolymers such as polyvinyl alcohol, polymethyl methacrylate, and polystyrene; and semi-crystalline polymers include polyesters, nylons, epoxies, polyvinyl chloride, polycarbonate, polyethylene, polypropylene, polyimides, and polyurethanes. Of the foregoing semi-crystalline polymers, polyester in a film is preferable and polyethylene terephthalate (PET) is a most preferable choice for the substrate. All of the materials set forth in this paragraph are commercially available.

The photopolymerizable material may be comprised of a photopolymerizable component, a photoinitiator, and a photoinhibitor. The photopolymerizable component, can be a photopolymerizable monomer or oligomer, or a mixture of photopolymerizable monomers and/or oligomers. Commercially-available photopolymerizable monomers and oligomers suitable for this application include epoxy resins such as bisphenol A epoxy resins, epoxy cresol novolac resins, epoxy phenol novolac resins, bisphenol F resins, phenol-glycidyl ether-derived resins, cycloaliphatic epoxy resins, and aromatic or heterocyclic glycidyl amine resins; allyls; vinyl ethers and other vinyl-containing organic monomers; and acrylates and methacrylates such as urethane acrylates and methacrylates, ester acrylates and methacrylates, epoxy acrylates and methacrylates, and (poly)ethylene glycol acrylates and methacrylates. Acrylate monomers are described in U.S. Pat. Nos. 5,396,350; 5,428,468, 5,462,700 and U.S. Pat. No. 5,481,385 which are incorporated herein by reference. Preferred photopolymerizable materials include (a) a mixture of acrylates and epoxy resins; (b) mixtures of aromatic diacrylates and bisphenol A epoxy resins; and (c) a mixture of ethoxylated bisphenol A diacrylate (EBDA) and Dow epoxy resin DER-362 (a polymer of bisphenol A and epichlorohydrin). An example of the last is a mixture of 70 parts by weight of EBDA and 30 parts by weight of Dow epoxy resin DER-362. Other materials can also be used as will readily occur to those skilled in the art. A factor relevant to the selection of the photopolymerizable component is that the cure rate and shrinkage of epoxy resins may differ from that of the acrylate materials.

The photoinitiator, produces an activated species that leads to photopolymerization of the monomer or oligomer or the mixture of monomers and/or oligomers when it is activated by light. Preferred photoinitiators are disclosed in U.S. Pat. No. 5,396,350, U.S. Pat. No. 5,462,700, and U.S. Pat. No. 5,481,385, cited above. The most preferred photoinitiator is $\alpha,\alpha$-dimethoxy-$\alpha$-phenyl acetophenone (such as Irgacure-651, a product of Ciba-Geigy Corporation). The photoinitiator has been successfully used at a loading level of 2 parts photoinitiator per hundred parts monomer or oligomer material. Preferably, the photoinitiator should be used at a loading level of 0.5-to-10 parts photoinitiator per hundred parts of the monomer or oligomer material, and more preferably at a loading level of 1-to-4 parts photoinitiator per hundred parts monomer or oligomer material.

The inhibitor, prevents photopolymerization at low light levels. The inhibitor raises the threshold light level for polymerization of the photopolymer so that there will be a distinct boundary between the crosslinked and the non-linked photopolymerizable material instead of a gradient. Various inhibitors are known to those skilled in the art, as described in U.S. Pat. No. 5,462,700 and U.S. Pat. No. 5,481,385, cited above. Oxygen is a preferred inhibitor and is readily available if the photopolymerization is performed in the presence of air.

Figure 8:
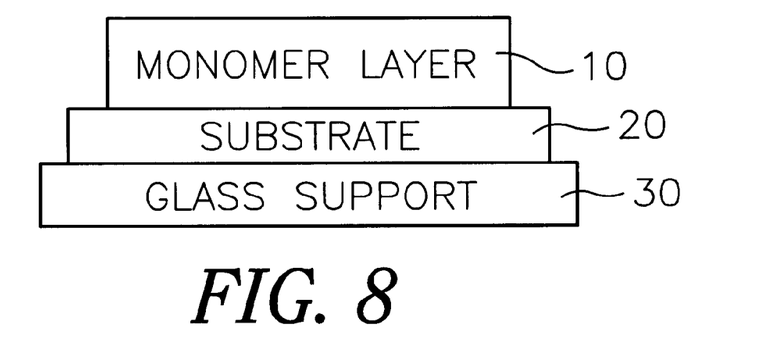
FIG. 8 shows a structure for producing a diffuser according to the invention.

FIG. 8 shows a structure for producing a diffuser according to the invention. A layer of photopolymerizable material 10 is deposited upon a substrate 20 by any convenient method, such as doctor blading, resulting in a layer of a generally uniform thickness of about 0.02 mm to about 2 mm, preferably of about 0.12 mm to about 0.37 mm, and more preferably a thickness of about 0.2 mm to about 0.3 mm. Satisfactory results have been obtained with a layer of a generally uniform thickness of about 0.2 mm to about 0.3 mm. Optionally, a glass support layer 30 can be placed underneath the substrate. Preferably, the top surface of the layer 10 is open to an atmosphere containing oxygen.

Figure 9:
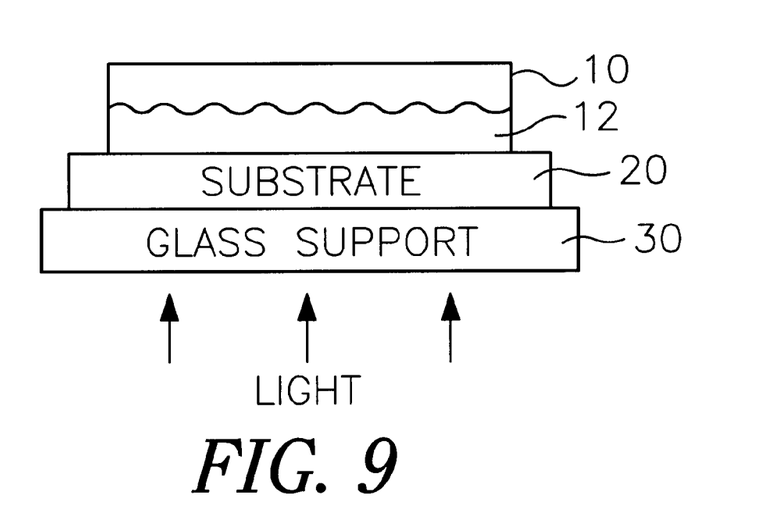
FIG. 9 shows light directed through the bottom surface of the structure of FIG 8.

As seen in FIG. 9, collimated or nearly-collimated light is directed through the bottom surface of the substrate 20 and through the photopolymerizable layer. If a glass support layer 30 has been provided, the light first passes through the glass. The light can be any visible light, ultraviolet light, or other wavelengths (or combinations of wavelengths) capable of inducing polymerization of the photopolymerizable material, as will readily occur to those skilled in the art. However, many of the commonly-used photoinitiators, including Irgacure-651, respond favorably to ultraviolet light in the wavelength range from about 350 nm to about 400 nm, although this range is not critical. Preferably, the intensity of the light ranges from about 1 mW/cm$^2$ to about 1000 mW/cm$^2$, more preferably from about 5 mW/cm$^2$ to about 200 mW/cm$^2$, and optimally about 10 mW/cm$^2$ to about 30 mW/cm$^2$. Satisfactory results have been obtained with a light intensity of approximately 30 mW/cm$^2$.

As light passes through the photopolymerizable layer 10, the molecules of the photopolymerizable material will begin to crosslink (or polymerize), beginning at the bottom surface of the photopolymerizable layer. Before the entire thickness of the photopolymerizable layer has had an opportunity to crosslink, the light is removed, leaving only the lower photocrosslinked polymer component 12 of the photopolymerizable layer 10. The dosage of light required to achieve the desired amount of crosslinking depends on the photopolymerizable material employed. For example, if the photopolymerizable mixture of EBDA and Dow epoxy resin DER-362 material and the photoinitiator $\alpha,\alpha$-dimethoxy-$\alpha$-phenyl acetophenone are used and applied in a thickness ranging from about 0.2 mm to about 0.3 mm, the total light dose received by the photopolymerizable layer preferably ranges from about 5 mJ/cm$^2$ to about 2000 mJ/cm$^2$, more preferably from about 20 mJ/cm$^2$ to about 300 mJ/cm$^2$, and optimally from about 60 mJ/cm$^2$ to about 120 mJ/cm$^2$. A satisfactory result was obtained using the photopolymerizable mixture of EBDA and Dow epoxy resin DER-362 material. It was applied in a thickness of approximately 0.2 mm to 0.3 mm, together with the photoinitiator Irgacure-651 at a level of 2 parts photoinitiator per hundred parts of the photopolymerizable mixture. The light source intensity was approximately 30 mW/cm$^2$ and the dosage was between 60 mJ/cm$^2$ and 120 mJ/cm$^2$.

A developer is then applied to the photopolymerizable layer to remove the unpolymerized portion. The developer can be any material, usually liquid, that will dissolve or otherwise remove the unpolymerized material without affecting the crosslinked component. Suitable developers are organic solvents such as methanol, acetone, methyl ethyl ketone (MEK), ethanol, isopropyl alcohol, or a mixture of such solvents. Alternatively, one can employ a water-based developer containing one or more surfactants, as will readily occur to those skilled in the art. After the unpolymerized portion had been removed, the photocrosslinked component 40 remains on the substrate.

Figure 10:
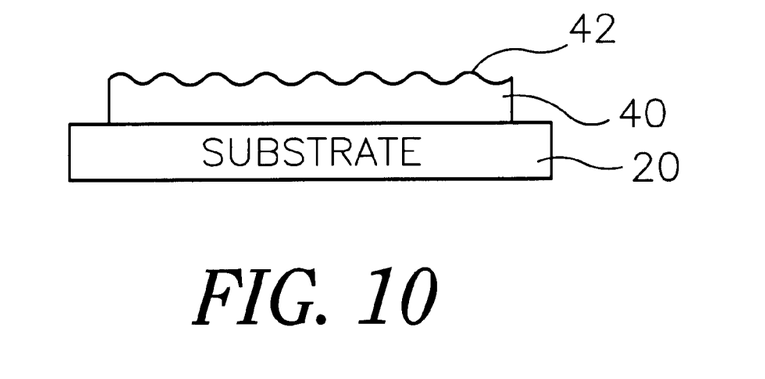
FIG. 10 shows a diffuser having high modulation, exhibiting smooth bumps.

As seen in FIG. 10, the surface 42 of the photocrosslinked component 40 is highly modulated, exhibiting smooth bumps ranging in size from about 1 micron to about 20 microns in both height and width, although they may be larger or smaller. The aspect ratios, i.e., the ratios of the heights to the widths, of the bumps on the highly modulated surface of the photocrosslinked component are generally quite high. Since the substrate is optically clear or semi-clear to the unaided human eye and has no obvious masking features to block light transmission, one might not expect the highly-modulated surface. A highly modulated surface can be achieved with substrates fabricated from photopolymerizable material containing only one monomer or oligomer component, or a mixture of such components. These photocrosslinked materials will exhibit variations in the spatial uniformity of polymerization due to random fluctuations in the spatial intensity of the applied light and statistical fluctuations in the microscopic structure of the substrate. An example of the latter is the material PET, a semi-crystalline polymer material containing random microscopic crystals interspersed with amorphous polymer. The random microscopic crystals will refract light differently than the surrounding amorphous polymer if the refractive indexes of the two phases are slightly different. Internally, the polymerized component will exhibit striations running through the thickness of the layer. The dosage of light can be applied in a single exposure or in multiple exposures or doses, leaving the photopolymerizable material unexposed to light between exposures. Multiple exposures of light to achieve the same total dosage can result in a surface more highly modulated than would occur from a single exposure. The photopolymerized component can be used in a number of ways. For example, it can be employed as a light diffuser in a projection viewing screen or as a component in a liquid crystal display (LCD) illumination system to hide the system's structural features.

A conforming metal replica layer can be formed on the highly-modulated surface through electroforming, electroless deposition, vapor deposition, and other techniques as will readily occur to those skilled in the art. The metallic layer is then used to make embossed copies of the surface structure of the original photocrosslinked component. The metallic replica layer may be used in a varied of known embossing methods such as thermal embossing into clear or translucent thermoplastic materials or soft-embossing or casting (i.e., photocure embossing) into a clear or translucent photoreactive material or mixture. An embossable layer of material, such as polycarbonate, acrylic polymer, vinyl polymer, even photopolymerizable material, is placed on a substrate. The metallic replica layer is then applied to the embossable layer, creating a mating surface. In the case of hard embossing or preferably thermal embossing, the metallic replica layer is pushed into the surface of the embossable layer, simultaneously with the application of heat or pressure, or both. In the case of soft embossing or casting, the metallic replica layer is placed in contact with a reactive liquid photopolymerizable material, and the latter is then photoexposed to form a solid polymeric film. Typically, the light used to expose the photopolymer in a soft embossing application is not collimated. Therefore, unless the embossable layer was fabricated from photopolymerizable material exposed to collimated or nearly collimated light, the embossable layer will not have striations. By using any of the foregoing embossing techniques, a large number of pieces having the surface contour of the highly-modulated surface of the original photocrosslinked component can be made. The metallic replica layer is removed leaving the resulting embossed layer. The embossed layer may be employed as a light diffuser, with or without the underlying substrate.

Figure 11:
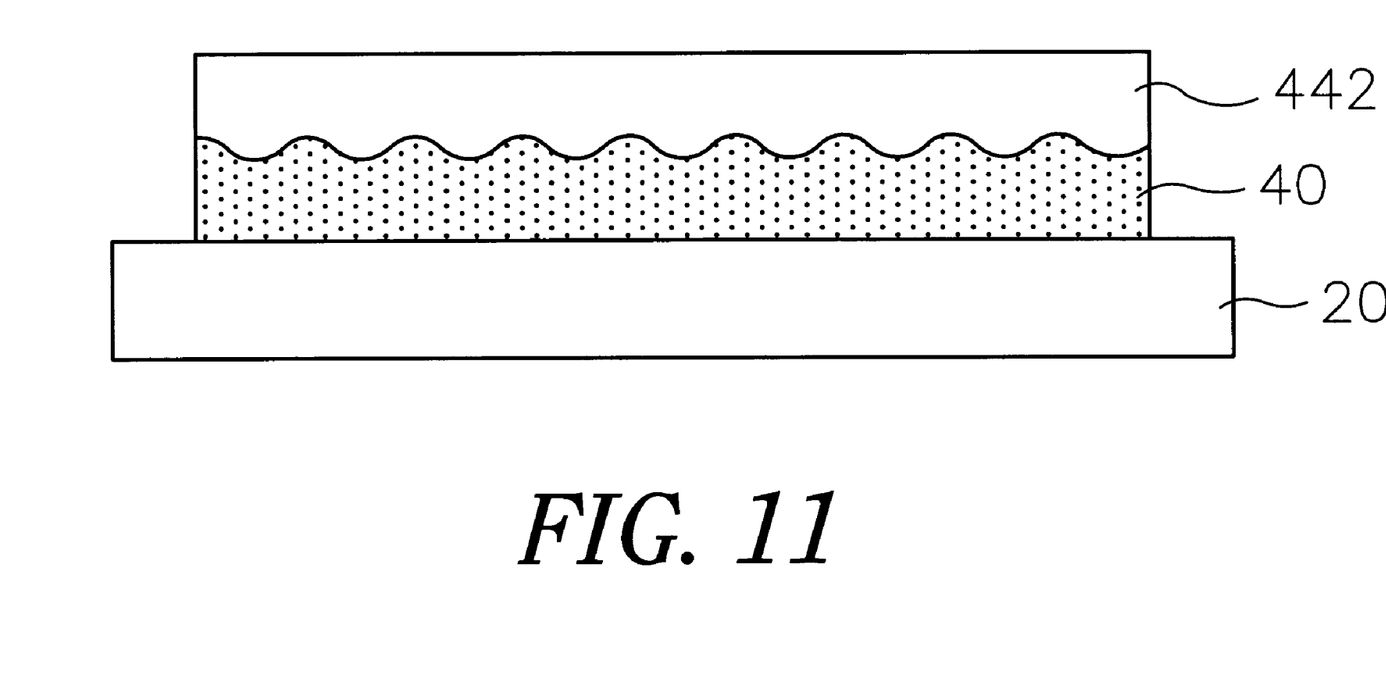
FIG. 11 shows a diffuser having high modulation, exhibiting smooth bumps and a translucent fill layer.

To reduce backscattering of light, the photocrosslinked component can be coated with a transparent or translucent fill layer 442 as seen in FIG. 11. Similarly, the fill layer could be applied to an embossed layer. The index of refraction $n_2$ of the fill layer may differ from the index $n_1$ of the photocrosslinked component. For example, if $n_1$=1.55, then $n_2$ may range from about 1.30 to about 1.52, or from about 1.58 to about 1.80. The optimal refractive index is a function of the desired distribution of the light exiting the diffuser, i.e., for a given value for $n_1$, the diffusing light pattern obtained when light passes completely through the diffuser may be varied by changing $n_2$. Of course, one may also vary $n_1$ to suit the application. Suitable materials for the fill layer having an index of refraction typically less than $n_1$ include silicone, fluorinated acrylates or methacrylates, fluoro epoxies, fluorosilicones, fluororethanes, and other materials as will readily occur to those skilled in the art. Materials such as aromatic acrylates, having an index of refraction typically greater than n, may also be employed for the fill layer. In a variation, in lieu of an essentially homogenous material for the fill layer, a layer containing light-scattering particles having yet a third index of refraction $n_3$ could be utilized. Alternatively, light-scattering particles could be placed in the embossable layer. In either case, the light-scattering particles could be made from an optically-transmissive material such as glass beads or polymer beads or polymer particles made from, for example, amorphous, optically-clear polymers such as polystyrene, acrylics, polycarbonates, olefins, or other materials as will readily occur to those skilled in the art.

The various layers of the light diffusers of differing indices of refraction, could be arranged with respect to the light source to alter the diffusion effect on the light. For example, light could pass through the diffuser by first passing through a layer having a higher index of refraction and then passing through a layer having a lower index of refraction, or vice versa. In addition, the reflectivity of the diffusing structures and the amount of backscattered light also can be altered by changing the direction of the light passing through the structures. Preferably, for diffuser applications demanding low backscattering of incident light (the optical loss that lowers the efficiency of the optical system), the light should pass through the layer with the lower refractive index before the higher refractive index layer.

The diffuser can perform one or more of the following functions: hide the structural features of the scattering elements on the light transmitting means 413; improve the uniformity of light transmitted from the light transmitting means; define the angular distribution of light transmitted the light transmitting means, facilitating increased brightness or the same brightness at reduced power; and optionally function as a transflective diffuser, i.e., an optical device utilizing both transmitted light and reflected light.

Figure 4:
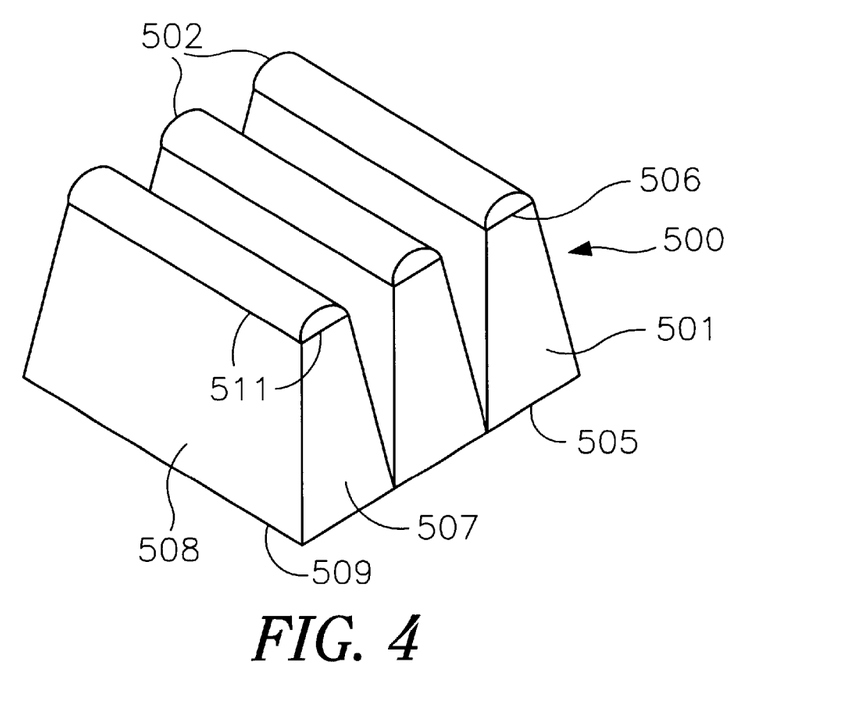
FIG. 4 shows an alternate embodiment of the illumination assembly wherein the microprism are elongated and have a rectangular light input end.
Figure 5:
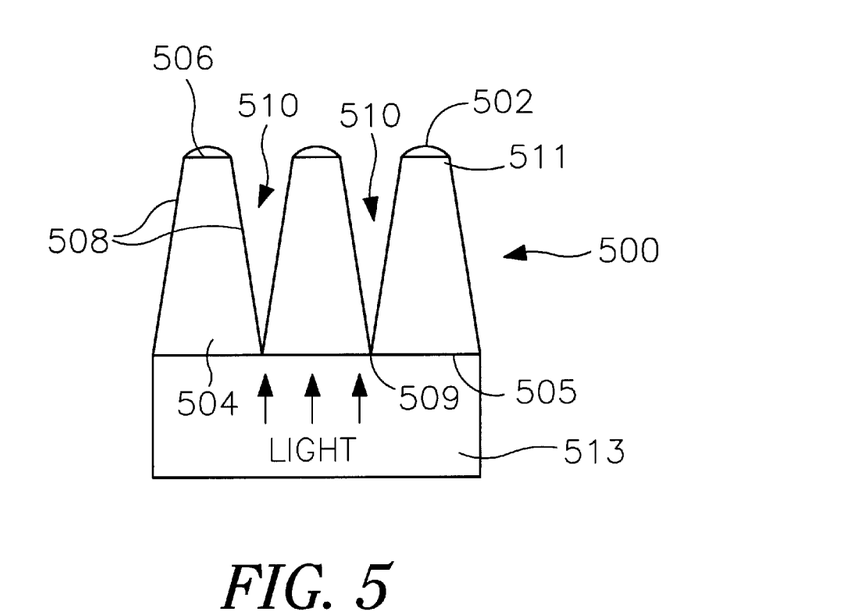
FIG. 5 shows a side elevational view of the illumination assembly of FIG. 4.

FIGS. 4 and 5 shows an alternate embodiment of the invention wherein an illumination system 500 comprises elongated microprisms 501 and have a rectangular light input end. and a microlens 502 on each microprism. Each microprism 501 has a light input end 505 optically connected to a light transmitting means 513, and a light output end 506. Each prism has a pair of oppositely positioned first sidewalls 508 and second side walls 507, each sidewall having an edge 509 at the light input end, and an edge 511 at the light output end. The first and second sidewalls are positioned for reflection of transmitted light from the light input end 505 toward the light output end 506. The sidewalls may optionally be provided with a light reflectance coating applied on the sidewalls to reduce light loss through the sidewalls.

The microprisms form a space 510 between each microprism of the array. When light from a light transmitting means 513 is directed into each microprism through the light input end 505, the light is directed by the sidewalls 507 and 508 through the microprisms and out each light output end 506 and then subsequently through each microlens 502.

Figure 6:
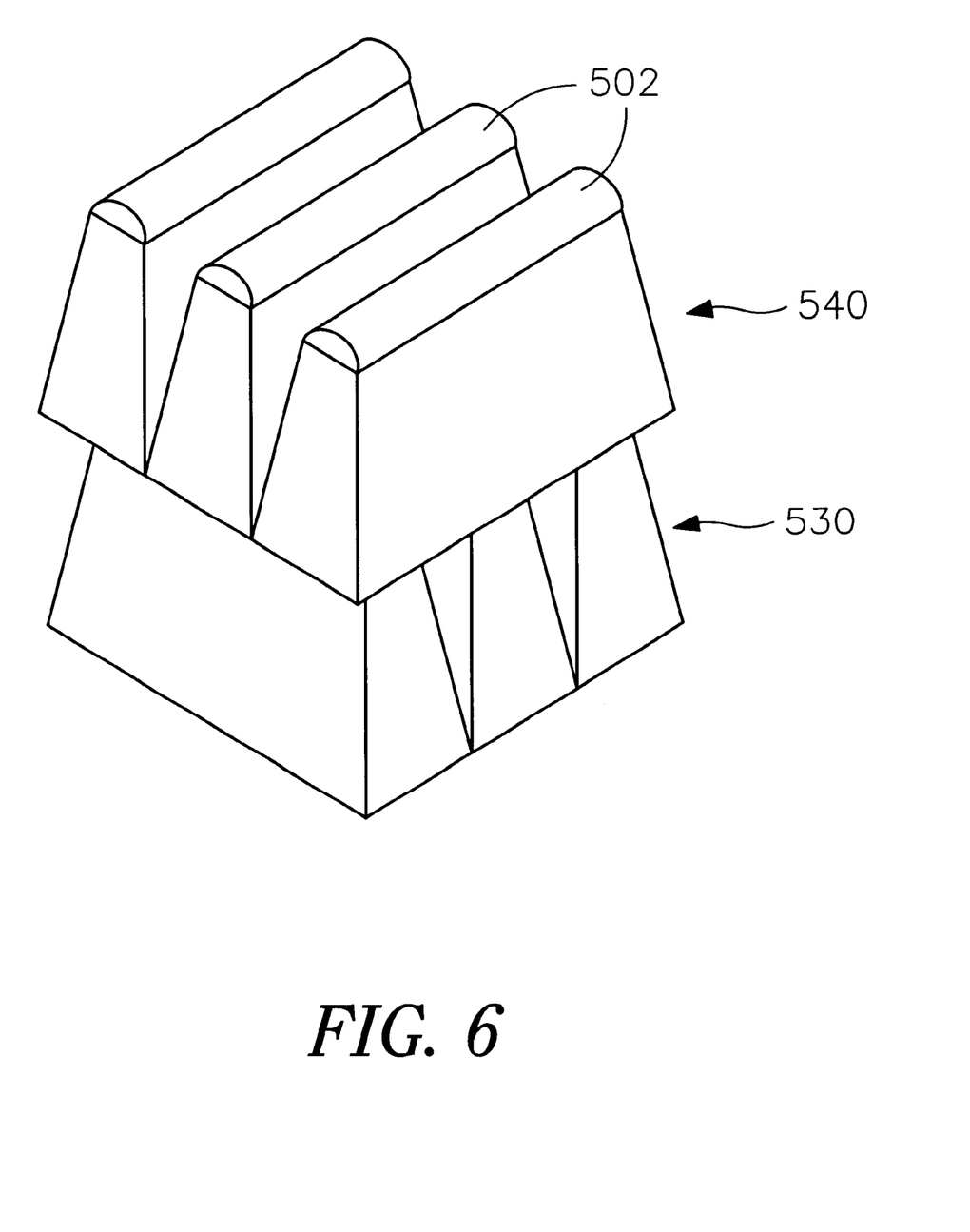
FIG. 6 perspective view of another embodiment of an illumination assembly including stacked layers of tapered microprism arrays.
Figure 7:
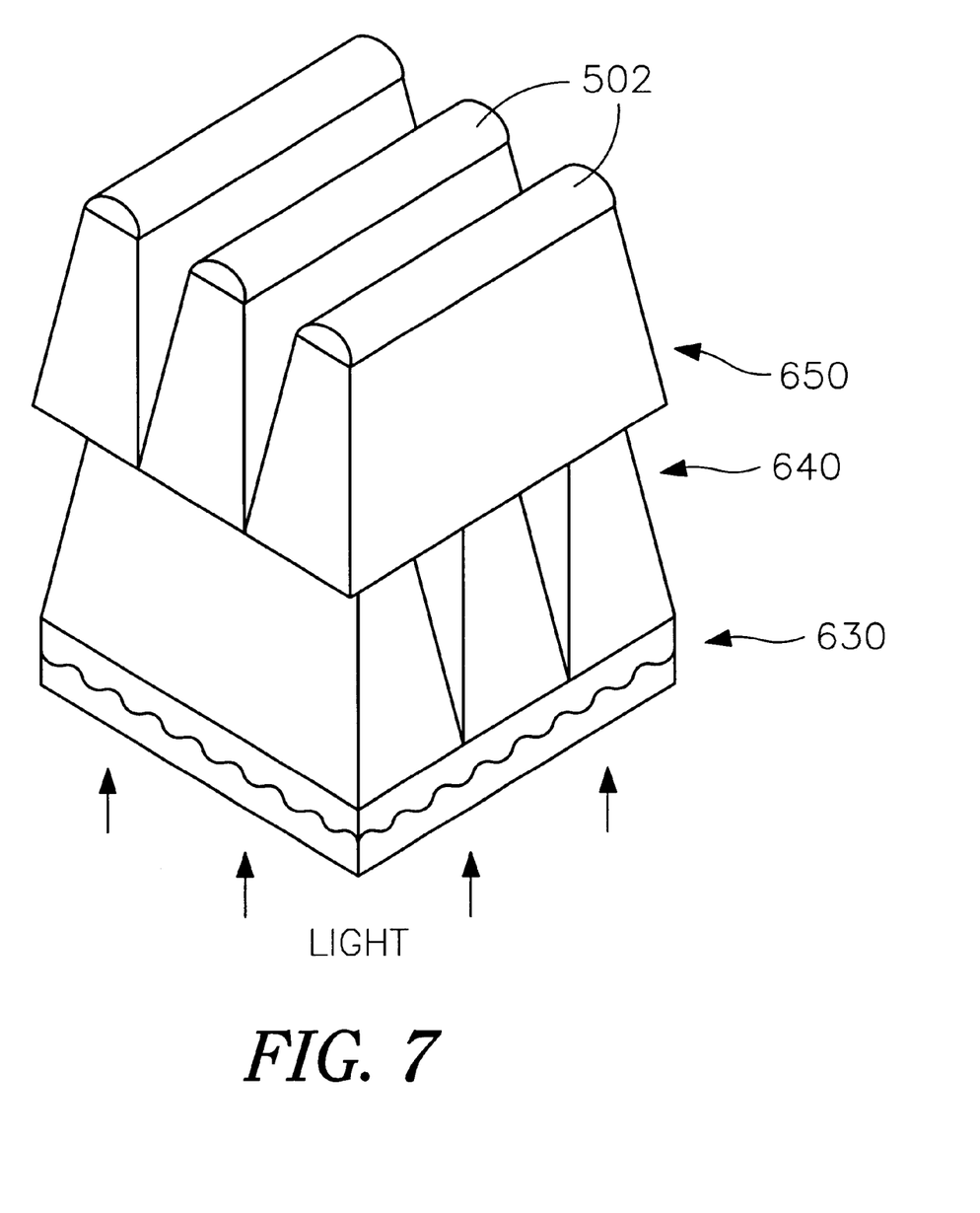
FIG. 7 shows a perspective view of an illumination assembly including stacked layer of tapered microprism arrays and a diffuser.

Also included are stacked layers of tapered microprism arrays. FIG. 6 shows an embodiment of the invention wherein a first elongated array of microprisms 530 is attached to a second elongated array of microprisms 540 wherein the microlenses are at the light output end of the second microprism array. FIG. 7 shows a perspective view of an illumination assembly including stacked layers of tapered microprism arrays. A first elongated array of microprisms 640 is attached to a second elongated array of microprisms 650 wherein the microlenses 502 are at the light output end of the second microprism array 650. This arrangement also includes a diffuser 630 which is similar in structure to diffuser 440 above.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. An illumination assembly comprising:
   (a) a light transmitting means;
   (b) an array of microprisms wherein each microprism comprises:
      (i) a light input end optically coupled to said light transmitting means;
      (ii) a light output end spaced from the light input end;
      (iii) a pair of oppositely positioned first sidewalls, each first sidewall having an edge defined by said light input end and an edge defined by said light output end; at least one of said first sidewalls being positioned for effecting reflection of transmitted light toward the light output end;
      (iv) a pair of oppositely positioned second sidewalls, each second sidewall having an edge defined by said light input end and an edge defined by said light output end; at least one of said second sidewalls being positioned for effecting reflection of transmitted light toward the light output end; and
   (c) a microlens on the light output end of each microprism, without an intermediate layer that extends laterally between two adjacent microprisms situated therebetween, such that when light from said light transmitting means enters each microprism through said light input end, the light is directed by said sidewalls through said microprisms and out each light output end.

2. The assembly of claim 1 wherein the microlenses are convex.

3. The assembly of claim 2 wherein the microlenses have a single axis of curvature.

4. An illumination assembly comprising:
   (a) a light transmitting means;
   (b) an array of microprisms wherein each microprism comprises:
      (i) a light input end optically coupled to said light transmitting means;
      (ii) a light output end spaced from the light input end;
      (iii) a pair of oppositely positioned first sidewalls, each first sidewall having an edge defined by said light input end and an edge defined by said light output end; at least one of said first sidewalls being positioned for effecting reflection of transmitted light toward the light output end;
      (iv) a pair of oppositely positioned second sidewalls, each second sidewall having an edge defined by said light input end and an edge defined by said light output end; at least one of said second sidewalls being positioned for effecting reflection of transmitted light toward the light output end; and
   (c) a microlens on the light output end of each microprism, such that when light from said light transmitting means enters each microprism through said light input end, the light is directed by said sidewalls through said microprisms and out each light output end, the microlenses having two perpendicular axes of curvature.

5. The assembly of claim 1 wherein the microlenses are integrally formed with the light output end of each microprism.

6. An illumination assembly comprising:
   (a) a light transmitting means;
   (b) an array of microprisms wherein each microprism comprises:
      (i) a light input end optically coupled to said light transmitting means;
      (ii) a light output end spaced from the light input end;
      (iii) a pair of oppositely positioned first sidewalls, each first sidewall having an edge defined by said light input end and an edge defined by said light output end; at least one of said first sidewalls being positioned for effecting reflection of transmitted light toward the light output end;
      (iv) a pair of oppositely positioned second sidewalls, each second sidewall having an edge defined by said light input end and an edge defined by said light output end; at least one of said second sidewalls being positioned for effecting reflection of transmitted light toward the light output end; and
   (c) a microlens on the light output end of each microprism, such that when light from said light transmitting means enters each microprism through said light input end, the light is directed by said sidewalls through said microprisms and out each light output end, the microlenses are directly attached to the light output end of each microprism without an intermediate spacer element.

7. The assembly of claim 6 wherein the microlenses have substantially the same index of refraction as the microprisms.

8. An illumination assembly comprising:
   (a) a light transmitting means;
   (b) an array of microprisms wherein each microprism comprises:
      (i) a light input end optically coupled to said light transmitting means;
      (ii) a light output end spaced from the light input end;
      (iii) a pair of oppositely positioned first sidewalls, each first sidewall having an edge defined by said light input end and an edge defined by said light output end; at least one of said first sidewalls being positioned for effecting reflection of transmitted light toward the light output end;
      (iv) a pair of oppositely positioned second sidewalls, each second sidewall having an edge defined by said light input end and an edge defined by said light output end; at least one of said second sidewalls being positioned for effecting reflection of transmitted light toward the light output end; and
   (c) a microlens on the light output end of each microprism, such that when light from said light transmitting means enters each microprism through said light input end, the light is directed by said sidewalls through said microprisms and out each light output end, the microlenses are directly attached to the light output end of each microprism by means of an index of refraction matching fluid or adhesive.

9. The assembly of claim 1 further comprising a black colorant between the sidewalls of adjacent microprisms.

10. The assembly of claim 1 further comprising a light diffusing element optically coupled between the light transmitting means and the light input end.

11. The assembly of claim 10 wherein the light diffusing element is attached to the light input end.

12. The assembly of claim 1 further comprising a light reflectance coating on the sidewalls.

13. The assembly of claim 1 wherein the light output end has a surface area less than that of the light input end.

14. The assembly of claim 1 wherein the microprisms have inwardly tapered sidewalls, and the light output end has a surface area less than that of the light input end.

15. The assembly of claim 1 wherein said microprisms, microlenses, and light transmitting means have an index of refraction of from about 1.40 and about 1.65.

16. The assembly of claim 1 wherein said light transmitting means is a waveguide.

17. The assembly of claim 1 wherein said microprisms and microlenses are constructed from an organic polymeric material.

18. The assembly of claim 1 wherein said light output end has a surface parallel to a surface of said input end.

19. The assembly of claim 1 wherein selected first and second sidewalls form a tilt angle of from about 2 to about 25 degrees to the normal of the plane of said light input end.

20. The assembly of claim 1 wherein said second sidewalls forms a tilt angle of from about 5 to about 25 degrees to the normal of the plane of said light input end.

21. An illumination assembly comprising:
(a) a light transmitting means;
(b) an array of microprisms wherein each microprism comprises:
  (i) a light input end optically coupled to said light transmitting means;
  (ii) a light output end spaced from the light input end;
  (iii) a pair of oppositely positioned first sidewalls, each first sidewall having an edge defined by said light input end and an edge defined by said light output end; at least one of said first sidewalls being positioned for effecting reflection of transmitted light toward the light output end;
  (iv) a pair of oppositely positioned second sidewalls, each second sidewall having an edge defined by said light input end and an edge defined by said light output end; at least one of said second sidewalls being positioned for effecting reflection of transmitted light toward the light output end;
(c) a microlens on the light output end of each microprism, such that when light from said light transmitting means enters each microprism through said light input end, the light is directed by said sidewalls through said microprisms and out each light output end; and
(d) an array of second microprisms attached between the array of microprisms and the microlenses, wherein each second microprism comprises:
  (i) a second light input end optically coupled to said light transmitting means;
  (ii) a second light output end;
  (iii) a second pair of oppositely positioned first sidewalls, each first sidewall having an edge defined by said second light input end and an edge defined by said second light output end; at least one of said first sidewalls being positioned for effecting reflection of transmitted light toward the second light output end;
  (iv) a pair of oppositely positioned second sidewalls, each second sidewall having an edge defined by said second light input end and an edge defined by said second light output end; at least one of said second sidewalls being positioned for effecting reflection of transmitted light toward the second light output end and the microlenses.

22. The assembly of claim 21 further comprising a light diffusing element optically coupled between the light transmitting means and the light input end.

23. An illumination assembly comprising:
(a) a light transmitting means;
(b) an array of microprisms wherein each microprism comprises:
  (i) a light input end optically coupled to said light transmitting means;
  (ii) a light output end spaced from the light input end;
  (iii) a pair of oppositely positioned first sidewalls, each first sidewall having an edge defined by said light input end and an edge defined by said light output end; at least one of said first sidewalls being positioned for effecting reflection of transmitted light toward the light output end;
  (iv) a pair of oppositely positioned second sidewalls, each second sidewall having an edge defined by said light input end and an edge defined by said light output end; at least one of said second sidewalls being positioned for effecting reflection of transmitted light toward the light output end;
(c) a microlens on the light output end of each microprism, without an intermediate layer that extends laterally between two adjacent microprisms situated therebetween, such that when light from said light transmitting means enters each microprism through said light input end, the light is directed by said sidewalls through said microprisms and out each light output end; and
(d) a light diffusing element optically coupled between the light transmitting means and the light input end.

24. The assembly of claim 23 wherein the light diffusing element is attached to the light input end.

25. The assembly of claim 23 wherein the light diffusing element comprises a transparent or translucent substrate having smooth bumps on a substrate surface, said bumps ranging from about 1 micron to about 20 microns in both height and width.

26. The assembly of claim 23 wherein the bumps comprise a polymerized material on the surface of the substrate.

27. The assembly of claim 23 wherein the bumps are in juxtaposition with the light input end of the microprisms.

28. An illumination assembly having an array of microprisms, wherein each microprism comprises:
(a) a light input end for receiving light;
(b) a light output end spaced from the light input end;
(c) one or more sidewalls, wherein each sidewall has an edge defined by said light input end and an edge defined by said light output end; at least one of said one or more sidewalls being positioned for effecting reflection of transmitted light toward the light output end; and
(d) a microlens on the light output end of each microprism, without an intermediate layer that extends laterally between two adjacent microprisms situated therebetween, such that when light from said light transmitting means enters each microprism through said light input end, the light is directed by said one or more sidewalls through said microprisms and out each light output end.

29. An illumination assembly comprising:
(a) a light transmitting means;
(b) an array of microprisms wherein selected microprisms comprise:
  (i) a light input end optically coupled to said light transmitting means;
  (ii) a light output end spaced from the light input end;
  (iii) one or more sidewalls, wherein each sidewall has an edge defined by said light input end and an edge defined by said light output end; at least one of said one or more sidewalls being positioned for effecting reflection of transmitted light toward the light output end; and
  (iv) said light output end is shaped to define a microlens, without an intervening layer in between said microlens and said light output end.

* * * * *